US010322784B2

(12) United States Patent
Gai et al.

(10) Patent No.: US 10,322,784 B2
(45) Date of Patent: Jun. 18, 2019

(54) COMBINATION OF PROPULSION GROUP AND MARINE VESSEL, PROPULSION METHOD OF A MARINE VESSEL, AND PROPULSION GROUP FOR MARINE VESSEL

(71) Applicant: ULTRAFLEX S.P.A., Casella (GE) (IT)

(72) Inventors: Marcella Gai, Busalla (IT); Enrico Pagani, Crocefieschi (IT); Marco Vaccari, Genoa (IT); Matteo Del Turco, Ronco Scrivia (IT)

(*) Notice: Subject to any disclaimer, the term of this patent is extended or adjusted under 35 U.S.C. 154(b) by 0 days.

(21) Appl. No.: 15/584,927

(22) Filed: May 2, 2017

(65) Prior Publication Data
US 2017/0320554 A1    Nov. 9, 2017

(30) Foreign Application Priority Data

May 5, 2016    (IT) ........................ 102016000046146

(51) Int. Cl.
| B63H 20/08 | (2006.01) |
| B63H 20/12 | (2006.01) |
| B63H 20/20 | (2006.01) |
| G05D 3/12 | (2006.01) |
| B63H 20/00 | (2006.01) |
| B63J 99/00 | (2009.01) |

(52) U.S. Cl.
CPC ............. *B63H 20/08* (2013.01); *B63H 20/12* (2013.01); *B63H 20/20* (2013.01); *G05D 3/12* (2013.01); *B63H 2020/003* (2013.01); *B63J 2099/006* (2013.01)

(58) Field of Classification Search
CPC ........................................................ B63H 20/08
See application file for complete search history.

(56) References Cited

U.S. PATENT DOCUMENTS

| 4,077,353 A | 3/1978 | Webb, Jr. |
| 5,186,666 A | 2/1993 | Stanley |
| 6,174,211 B1 | 1/2001 | Nakamura |
| 8,007,328 B2 * | 8/2011 | Williams ............... B63H 20/08 114/151 |

FOREIGN PATENT DOCUMENTS

WO    2015072895    5/2015

* cited by examiner

*Primary Examiner* — Stephen P Avila
(74) *Attorney, Agent, or Firm* — Themis Law

(57) ABSTRACT

Combination of marine vessel and outboard motor, wherein at least one outboard motor is attached in a predetermined position to the transom of the marine vessel, the motor being mounted so as to translate according to a path with at least one motion component having an orientation parallel to the direction of the transverse axis of the hull and/or parallel to the transom of said hull and alternatively towards one or the other side of the hull.

20 Claims, 11 Drawing Sheets

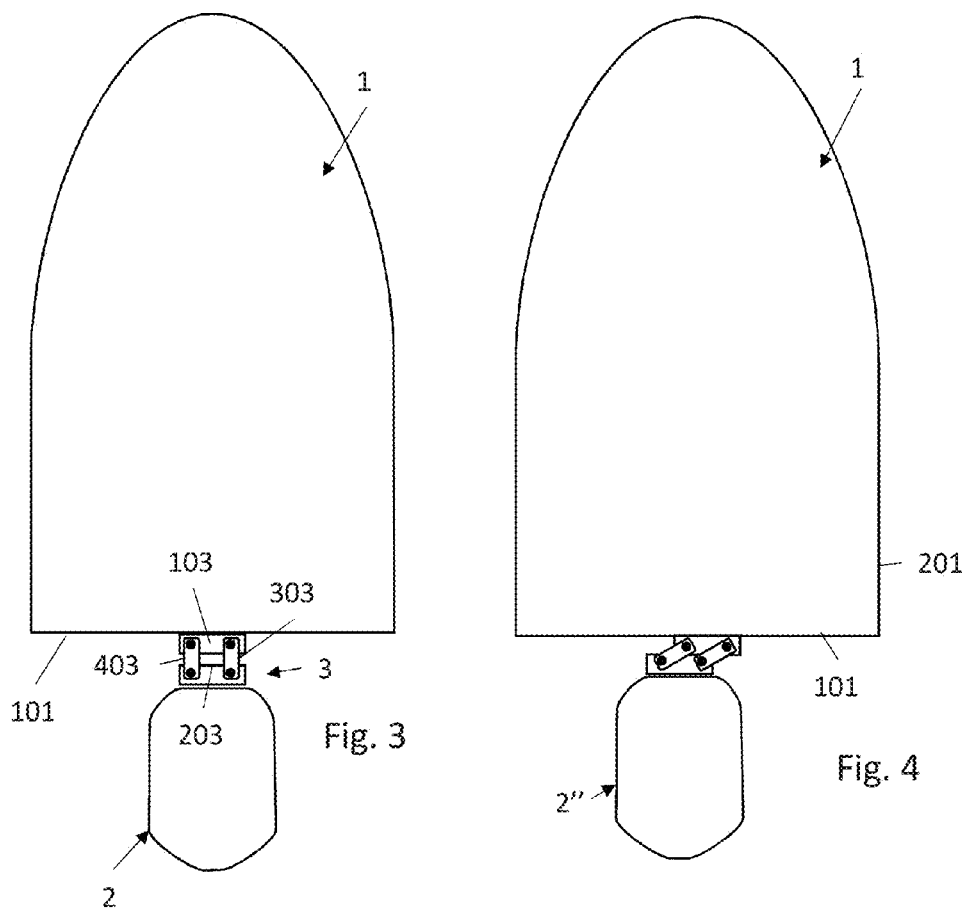
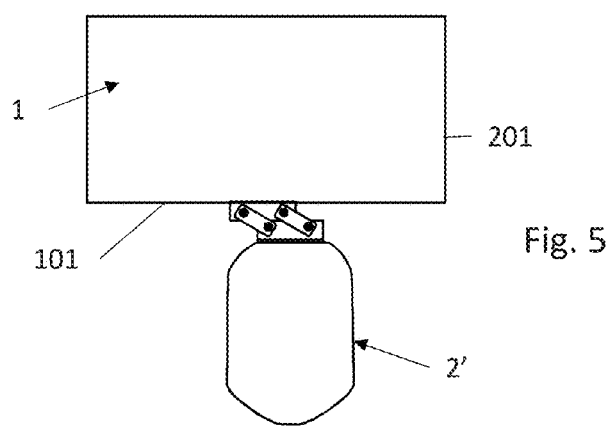

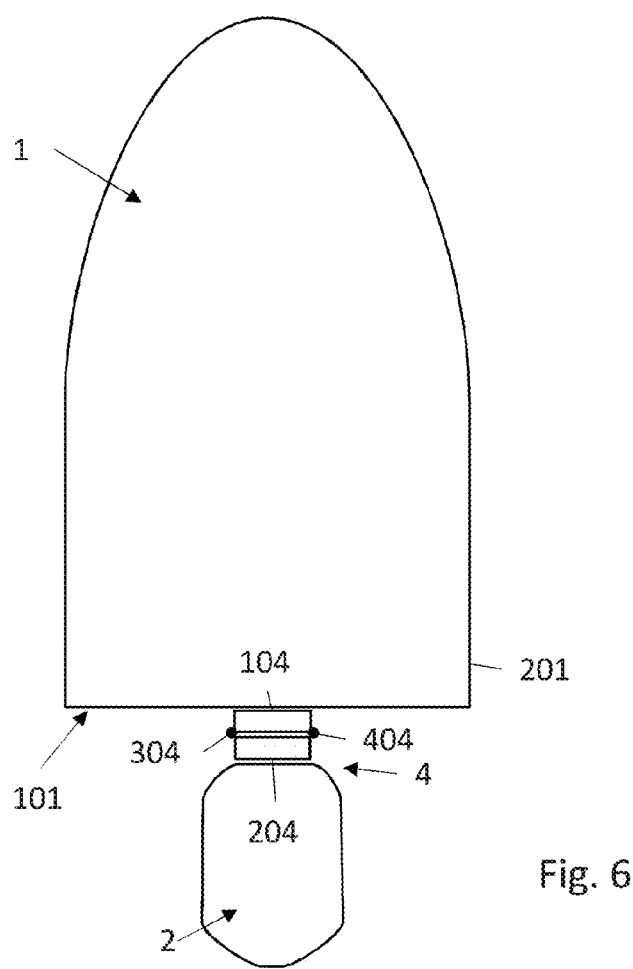
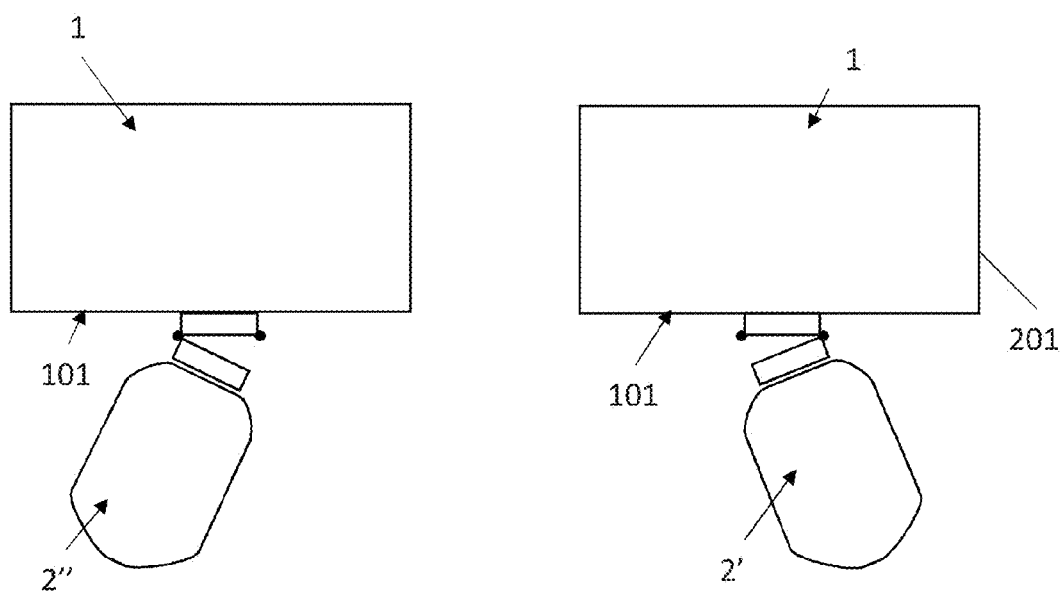
Fig. 6
Fig. 7
Fig. 8

COMBINATION OF PROPULSION GROUP AND MARINE VESSEL, PROPULSION METHOD OF A MARINE VESSEL, AND PROPULSION GROUP FOR MARINE VESSEL

FIELD OF THE INVENTION

The present invention relates to a combination of propulsion group and marine vessel, propulsion method of a marine vessel, and propulsion group for marine vessel.

The object of the present invention is to improve performance of marine motors particularly outboard motors in order to allow the user to optimize the thrust effect in relation to different rate and floating conditions and different shapes of the hull.

BACKGROUND OF THE INVENTION

Currently the displacement of outboard motors provides the traditional steering rotation, the motor to be pivoted about a horizontal axis substantially parallel to the transverse axis of the marine vessel, so called "trim" movement, and a translation along a vertical direction along a vertical axis or an axis comprised in the vertical plane and inclined towards the stem or stern of the marine vessel.

Motor trimming causes the propellers to change their orientation modifying the direction of the thrust force by orienting such force more downwardly or upwardly.

The vertical translation obtained by means of powered slides called as jack-plates interposed between the transom of the marine vessel and the motor determines the position of the propellers relative to the water surface, namely their degree of immersion and also the position of the propellers relative to the lower corner of the transom.

However in known systems the translation of two or more motors occurs always contemporaneously, that is together and by the same extent, since a jack plate common to all the motors is provided.

SUMMARY OF THE INVENTION

The object of the present invention is to further optimize the possibilities of fully employing the propulsion thrust allowing the outboard motor or motors, namely the corresponding propellers, to be placed in such a position relative to the hull, particularly to the bottom thereof and to the water surface to maximize the control and performance of the marine vessel depending on needs of the selected rate and of maneuvers to be carried out.

The invention solves the problem by providing a marine vessel and outboard motor combination, wherein at least one outboard motor is attached in a predetermined position to the transom of said marine vessel said motor being mounted so as to translate according to a path with at least one motion component parallel to the direction of the transverse axis of the hull and/or parallel to the transom of said hull and alternatively towards one or the other side of the hull.

In the present description and in the claims, the term transverse, transverse component, transverse direction or transverse axis of translation of the motor or motors and/or of the propeller or propellers means a direction transverse to the longitudinal axis of the marine vessel, from one to the other side of said marine vessel, parallel to the reference waterplane of the marine vessel and preferably contained in the plane parallel to a frame or to the midship section of the marine vessel hull.

The term vertical translation or displacement or translation vertical component means a displacement in the direction of an axis transverse to the longitudinal axis of the marine vessel and perpendicular to the above mentioned transverse direction, that is contained in a plane parallel to a longitudinal section plane of the marine vessel hull.

With only one outboard motor, it is possible to move such motor in a position eccentric to the longitudinal axis of the hull, that is to the keel line thereof. This allows the steering action to be increased. Moreover particularly with V-bottomed shapes, the transverse displacement causes the propeller to protrude more or less beyond the lower corner of the transom depending on the position relative to the keel line taken by the propeller during the translation.

In presence of at least two outboard motors the invention provides the possibility of displacing the motors independently from each other according to a path having at least one displacement component parallel to the transom and/or perpendicular to the transom.

Thus for example the "vertical" translation that is the translation according to known jack-plates can occur separately for each motor and at a different extent for each motor such to optimize the effect controlling attitude, stability, speed and the desired direction of the hull.

With two outboard motors the effect of translation in the transverse direction of the marine vessel is further increased. During navigation the motors can be moved near each other to maximize the thrust in the forward direction.

During maneuver operations motors can be moved away from each other and brought closer to the respective side edge of the transom thus increasing the transverse force component on the center of rotation of the marine vessel and, in combination with the steering angle and with the set direction of rotation of the propeller, improve both the translation effect of the marine vessel achievable with prior art marine vessels, reducing longitudinal direction components or rotational components of the marine vessel, and the rotation effect of the marine vessel depending on the setting of the direction of motors as regards the relative position of the motors relative to the central longitudinal axis of the marine vessel.

The translation of motors, namely of propellers thereof, in the direction transverse to the keel line can be obtained by different types of displacement of the motors and by displacing the motors along different paths.

In a simpler embodiment, the translation takes place in a vertical plane or a plane having at least one vertical direction component and with a displacement of the motor or motors along a straight direction perpendicular to the longitudinal axis of the marine vessel and/or parallel to the transom.

In order to obtain the translation component in the transverse direction it is possible to use different types of devices supporting the outboard motors to the transom by means of which a mere transverse translation is performed, that is a displacement along a translation axis having an orientation transverse to the longitudinal axis of the marine vessel.

In this case for example it is possible to mount each outboard motor on a slide that is guided so as to move in a direction transverse to the transom, that is from side to side of the transom, along a supporting plate that in turn can be attached to the transom, while between the slide and the supporting plate there is provided a translation actuator that is controlled by control members through a power signal supply control unit.

The actuator and therefore also the power signal and means generating it can be of the mechanical, electromechanical, hydraulic, electro-hydraulic, electric, magnetic type that is any suitable type available in prior art for performing displacements.

According to a variant embodiment, the translation of the propeller in the direction transverse to the longitudinal axis of the marine vessel, that is in the direction of one or other side of the marine vessel occurs in combination with a displacement according to at least one further axis.

In this case, a first embodiment provides the motor or motors to be movable relative to the transom along a vertical plane parallel to the midship section or to a frame, or a plane parallel to the transom or to a plane inclined relative to the latter, particularly in the direction of the longitudinal axis of the hull, namely forwards or backwards or also in relation to a plane parallel to the transom.

The displacement in said plane can occur by combining two linear translations according to two directions not parallel to each other, preferably perpendicular ones, for example one of them being a transverse translation and one a vertical translation.

Particularly one of the two translations, that is the transverse one occurs along the axis parallel to the waterplane and the other one occurs along the axis parallel to a longitudinal plane that is the plane of symmetry of the marine vessel hull.

The term waterplane means the substantially horizontal plane containing the theoretical design waterline of the marine vessel.

The two translations according to two directions perpendicular to each other can be carried out by a combination of translating slides of which a first slide is mounted on sliding tracks along the supporting plate such to translate according to a first of the two translation directions and a second slide is mounted on the first slide by means of tracks for relative translation relative to said first slide oriented such to allow said second slide to translate in the second translation direction, while the motor is mounted on the second slide, and the supporting plate is attached to the transom.

Each slide is slidably controlled by an actuator that likewise the previous example can be of any type.

According to a variant the translation in the plane parallel to the midship section or inclined forwards or backwards in the direction of the stern or bow of the marine vessel, that is parallel to the transom or a tangent thereof, occurs along a curved line, for example a circular line.

In this case for example each motor can be mounted on a bracket constrained in a rotatable manner about an axis parallel to the longitudinal plane of symmetry of the marine vessel or with at least one component parallel to said longitudinal plane of symmetry.

Even in this case, the rotation can be controlled by any suitable actuator according to the different types listed for the first embodiment.

A further variant embodiment provides the combined displacement in a plane to take place according to two direction components of which one along the transverse direction and the other one along an axis parallel to the longitudinal axis of the hull and to the waterplane.

In this case, for example it is possible to combine two translations according to two directions not parallel to each other, in said plane, or it is possible to constrain the displacement of the motors according to a curved path, particularly a circular path.

One embodiment provides a supporting plate for each motor pivotably hinged along an axis parallel to the longitudinal plane of symmetry of the marine vessel, such that it performs a pivoting movement like a fan in the plane parallel to the waterplane.

Still according to a further variant, each motor is attached to the transom by a four-bar linkage, wherein the axes articulating the linkage bars with a motor fastening plate and with a plate fastening to the transom are oriented parallel with the plane of symmetry of the marine vessel. The displacement in a transverse direction of each motor is constrained with a contemporaneous displacement in the longitudinal direction of the hull by means of which the motor moves near and away from the transom.

According to a further embodiment the motor or motors can be contemporaneously displaced according to three motion components that are not parallel to one another and preferably oriented parallel to the waterplane, parallel to the midship section and parallel to the plane of symmetry respectively thus forming a triad of space Cartesian coordinates.

Also in this case the displacement devices can be merely Cartesian ones, that is a combination of slides each one slidable along one of the linear motion directions and each one provided with its own actuator.

As an alternative at least said two linear translations are combined and constrained with each other along a curved path providing a combination of actuators previously described.

For example one embodiment can provide the combination of two translations according to two directions perpendicular to each other actuated by the combination of translating slides, of a which a first slide is mounted on sliding tracks along the supporting plate such to translate according to a first of the two translation directions and a second slide is mounted on the first slide by means of tracks for the relative translation relative to said first slide oriented such to allow said second slide to translate in the second translation direction, while the motor is mounted on the second slide, and hinging said supporting plate to the transom about an axis parallel to the plane of symmetry of the hull, or as an alternative articulating the supporting plate with the transom by means of a four-bar linkage.

As an alternative it is also possible to provide the combination of the two translations according to two directions perpendicular to each other actuated by the combination of translating slides, of which a first slide is mounted on sliding tracks along the supporting plate such to translate according to a first of the two translation directions and a second slide is mounted on the first slide by means of tracks for the relative translation relative to said first slide oriented such to allow said second slide to translate in the second translation direction, while the motor is mounted on the second slide, and the supporting plate is mounted on at least one beam telescopically extendable and retractable in a direction parallel to the longitudinal axis of the marine vessel, or on a carriage sliding on tracks parallel to said longitudinal axis of the vessel.

According to still one embodiment it is possible to increase the degrees of freedom of the movement of the motor or motors by providing one or more of the preceding embodiments to be combined with a rotation about an axis of rotation having a component in direction of the longitudinal axis of the marine vessel.

Thus for example it is possible to combine the two translations according to two directions perpendicular to each other that are actuated by means of the combination of translating slides, of a which a first slide is mounted on sliding tracks along the supporting plate such to translate according to a first of the two translation directions and a second slide is mounted on the first slide by means of tracks for the relative translation relative to said first slide oriented such to allow said second slide to translate in the second translation direction, while the motor is mounted on the second slide and the supporting plate is mounted on an axis of rotation having a component in the direction of the longitudinal axis of the marine vessel, or it being parallel to said axis.

Likewise it is also possible to combine the transverse translation that is the one defined above occurring in a vertical plane parallel to the waterplane and perpendicular to the longitudinal axis of the marine vessel and/or parallel to the transom, with a rotation according to an axis parallel to the longitudinal axis of the marine vessel or having at least one component parallel to said longitudinal axis.

As it will be more clearly disclosed below such combinations of the motor displacements according to different paths aims at obtaining translation and also rotation effects for the marine vessel and a combination of such translation and rotation effects of different types, for example during maneuvers and in navigation in order to optimize performances of the marine vessel in different rate conditions.

The invention provides particular displacement paths for the motors and therefore for the propellers relative to the hull that will be described in more details in the following description.

As it is clear the systems for displacing the motor or motors can be of any suitable type and can provide at least one single degree of freedom or several degrees of freedom, that is the displacement of the motors according to two, three or even four axes.

Still a variant embodiment provides the displacement of the motors according to four axes for example by a combination of slides each one of them performing translations in one plane.

In this case it is possible to provide four axes of translation of each motor by means of which the following functions are obtained:

Translation along a fore-and-aft axis: it improves the marine vessel speed. It acts as a fixed or quadrilateral bracket.

Translation according to a starboard-port axis: it improves speed (motors moved near each other), it improves the maneuver (motors moved away from each other);

Translation according to an up-down axis: it improves speed (motors up), improves handling and reduces cavitation possibilities (down) above all when hauling;

Rotation about an axis of rotation "Z" (rotation along the longitudinal axis of the marine vessel): this is apparently the combination of two movements: vertical/horizontal and right/left movement. In substance if it is combined with the steering action when also the steering axis of the motors is inclined, it places the propeller axis in a position different from the movement position on the waterplane or on a plane inclined thereto (trimming). That is to say the motor has the axis of the propeller in the fore-and-aft direction when the steering is straight, but if the motor is steered and if the motor has already rotated along a fore-and-aft axis, then the axis of the propeller is placed on a different direction.

Moreover the invention provides to combine the devices supporting and attaching the motors to the transom of a marine vessel with a system controlling the actuators driving said devices, which system provides at least one control member that can be operated by the user and at least one control unit intended to receive control signals generated by said control member and to convert said signals into power signals intended to power the actuators in a manner corresponding to said signals generated by the control members.

It is also possible to provide one or more sensors for checking displacement conditions of the motor or motors and/or attitude and advancement conditions of the marine vessel acting as feedback signals in an automatic or manual control loop.

Feedback signals can comprise in addition to signals detecting the real position of the motor or motors, also signals about the vessel movement, for example changes in position by GPS signals and/or compass signals or also about attitude signals by means of accelerometers or the like and/or signals of anemometer and possibly also signals about the operating conditions of motors, forward movement, reverse movement and number of revolutions.

The system can also provide particularly at least one configuration/setting program executed by a processor of the control unit such to determine, on the basis of feedback signals, predetermined settings of the position of the motor or motors with reference to predetermined maneuver or navigation conditions.

Control members can provide a manual control or a plurality of predetermined settings that are available for the user and can be retrieved from a memory by means of a selection interface. In this case each setting mode can have its own name related to a type of maneuver or a navigation condition.

In some cases, it is possible to provide a dedicated control member for displacement of the motors, in other conditions it is possible to provide the motor displacement to be controlled in a manner combined with the setting of the number of revolutions of the motor and of the steering condition of the marine vessel, automatically through the combination of signals detecting the steering angle and/or the number of revolutions, therefore the motor or motors are displaced automatically in the proper translation and/or rotation position, operating on the lever changing the number of revolutions and the directional control member of the marine vessel.

Such automatic action can be activated and deactivated by means of said selector.

According to one embodiment, the control member for the motor displacement that is the translation and/or rotation can be in the form of a joystick.

Advantageously the joystick is provided in combination with a selector that allows the joystick to be enabled/disabled and that possibly, in presence of several motors, allows each motor to be separately and alternatively controlled or the two or more motors to be controlled in an integrated manner, namely in the first case each motor is translated separately from the other one by alternatively selecting one of the motors and enabling the control for translating and/or rotating it by the joystick, or namely selecting the combined control for the two motors together by means of the joystick.

In this case the interface can provide a plurality of combinations of relative positions of the motors relative to each other and to the transom that are set and stored beforehand in a memory of modes of synchronization of translation paths of the two or more motors and to each of such combinations a selection and activation command is associated.

The interface can be of the electromechanical or electronic/mechanical type, such as push buttons, selectors and other known devices, or it can be of graphical type and composed of a touch screen panel where a combination of images of virtual buttons is displayed that can be operated by touching them and/or a plurality of information windows.

At least some of the selection and activation commands can be provided in the form of push buttons also on the joystick rod.

According to an improvement, it is possible to associate to the control device, particularly to the joystick, a graphical representation, in the form of a transom plan view or a projection on a plane parallel to the midship section of the marine vessel of the transom since for some of the positions of the joystick there being associated images of the motor or motors in the corresponding translation position relative to the transom.

In one variant embodiment where the graphical representation is composed of images displayed on a display and generated by means of a graphic processor and a video card it is possible to show the real translation position of each motor relative to the transom for each position of the joystick.

In this case position information can be reconstructed based on control signals generated by the joystick.

As an alternative it is possible to provide also sensors detecting the real position of the motor or motors and a reconstruction of the image of the position of the motors relative to the transom on the basis of the signals detecting said real position.

Obviously as a command for translation/rotation of the motors and/or of the displacement of the motors corresponding to a translation and/or rotation of the marine vessel or a combination of such movements it is possible to provide also one or more push buttons.

As regards the possible displacement paths of the motors, as mentioned above, the translation in the transverse direction can be advantageously combined with a vertical translation. The inclination of the path that is the ratio of vertical to transverse component can be set depending on the shape of the hull that is of the bottom corner of the transom and on the draft of the motor skeg that is of the propeller or other propulsion means.

In the case of two motors, in one embodiment, the two motors are translated towards the corresponding side of the transom and contemporaneously are vertically translated increasing the draft of the corresponding propeller, therefore the path follows a V-shaped arrangement diverging towards the bottom. Moreover starting from a conventional fastening position of the motors the two motors can be moved near the plane of symmetry of the hull and at the same time moved vertically upwardly namely with a smaller draft of the propellers or the like.

Alternatively the movement can be inverted and therefore the path of the two motors can be V-shaped path converging towards the bottom, therefore a translation towards the corresponding side is combined with the motor being lifted vertically upwardly namely with a smaller draft of the propeller and a displacement of the two motors towards the center is combined with the motors being lowered namely a larger draft of the propellers with the motors in a condition moved near each other.

According to a further characteristic both the range of the translation in the transverse direction and the range in the vertical direction, that is the two vertical and transverse displacement components can be different or equal for the two motors, that therefore can take symmetrical or asymmetrical positions relative to the plane of symmetry of the hull.

The different position of the motors relative to the plane of symmetry of the hull can also be accomplished by changing the displacement position of one or both the motors set by the control member displacing the motors on the basis of the change or correction signals generated by other control members such as the directional control member and/or the control member of the number of revolutions and/or the control member of the reverse gear.

BRIEF DESCRIPTION OF THE DRAWINGS

These and other characteristics and advantages of the present invention will be more clear from the following description of some embodiments shown in the annexed drawings in which:

FIGS. 3 to 5 schematically are top plan views of one marine vessel provided with one motor mounted in the center and which motor is attached to the transom by a four-bar linkage with pivot axes parallel to the plane of symmetry and which constrains a translation movement according to the example of FIG. 1 with a translation movement in the longitudinal direction of the hull.

FIGS. 6 to 8 are a variant embodiment wherein the motor swings along alternatively one of two hinge axes of a motor fastening plate which hinge axes are parallel to the plane of symmetry of the hull.

FIG. 1 is further translatable according to a direction parallel to the plane of symmetry S, combining the transverse translation of the motors with a change in the draft of the propellers thereof.

DETAILED DESCRIPTION OF EMBODIMENTS OF THE INVENTION

With reference to the figures, a marine vessel comprises a hull 1 with a transom 101. A motor 2 is attached to the transom 101 in a central position. The outboard motor 2 is considered to be mounted such to be able to perform all possible displacements relative to the transom that are currently known in prior art and particularly steering rotation, trim inclination and translation in one direction having at least one component contained in the plane of symmetry of the hull or in a plane parallel thereto, particularly substantially vertical one.

It has to be noted that even when not expressly defined in the present description each displacement of one or more motors can be further combined with one or more of said displacements known in prior art and particularly always with a steering rotation of the motor or motors, and optionally a trim displacement or vertical translation.

In its simplest arrangement the invention provides, besides the steering rotation of the motor, the latter to be further displaceable along a direction parallel to the midship section plane or to a frame and parallel to the waterplane or according to a direction having at least one component parallel to the midship section plane or to a frame and parallel to the waterplane.

Figure 1:
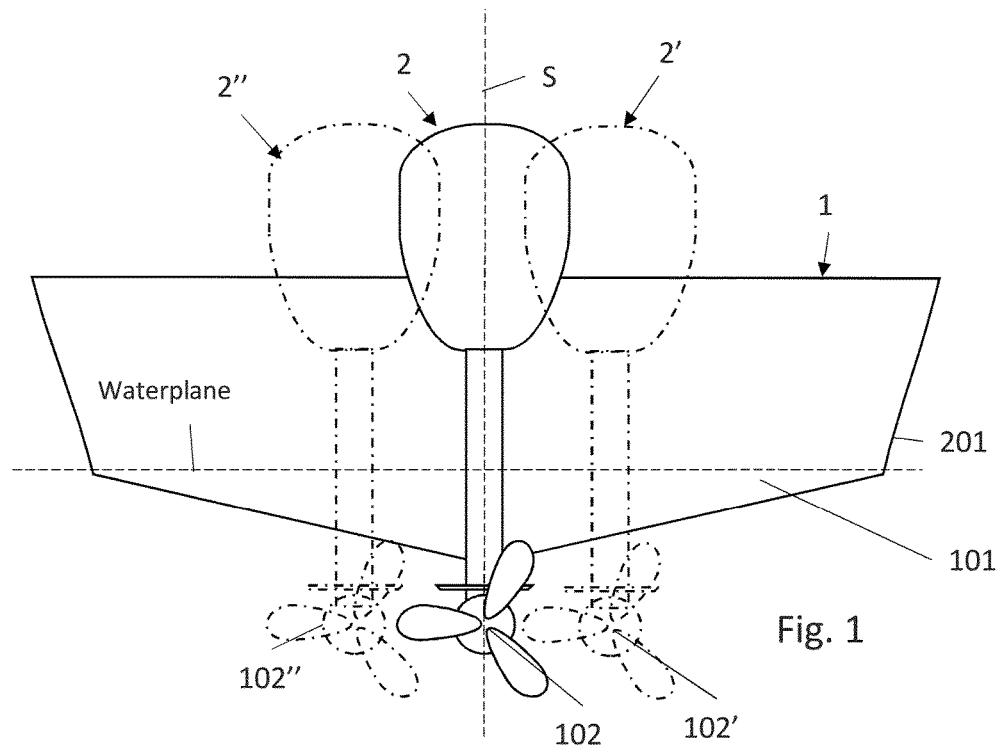
FIG. 1 schematically is a first embodiment where a marine vessel is provided with only one motor which motor is translatable according to a direction parallel to the waterplane or to a plane parallel thereto and perpendicular to the plane of symmetry S of the hull.

Such operating condition is shown in FIG. 1 a central outboard motor 2 can be displaced, by being controlled, from the central position in the direction of one or the other side 201 of the marine vessel 1.

By means of this, the thrust generated by the motor instead of being oriented only in the direction of the longitudinal central axis, that is in the direction of the keel line, is divided in a component parallel to and a component perpendicular to the keel line, generating a thrust also in the transverse direction of the hull and an angular momentum corresponding to the distance of the motor from the longitudinal central axis of the hull. If considering also that the motor 2 can be subjected to a steering rotation, then in conditions moved to a position eccentric to the plane of symmetry of the marine vessel it is possible to increase the steering action of the vessel with respect to the one that can be obtained by the simple steering oscillation of the motor. Moreover also the vessel stabilization effect is increased, likewise trim-tabs action, when in presence of bow waves, quarter waves or side waves. By considering also the reverse movement condition it is possible to obtain further optimizations of the directional steering effect of the marine vessel.

Considering the combination of the transverse translation, namely along a direction at least parallel to the waterplane, with a known vertical translation or translation having at least one vertical component, that is parallel to the midship section and to the plane of symmetry, the motor can perform a displacement in two perpendicular directions in a vertical plane, that is parallel to the midship section of the hull or inclined with respect thereto in the bow or stern direction.

Figure 16:
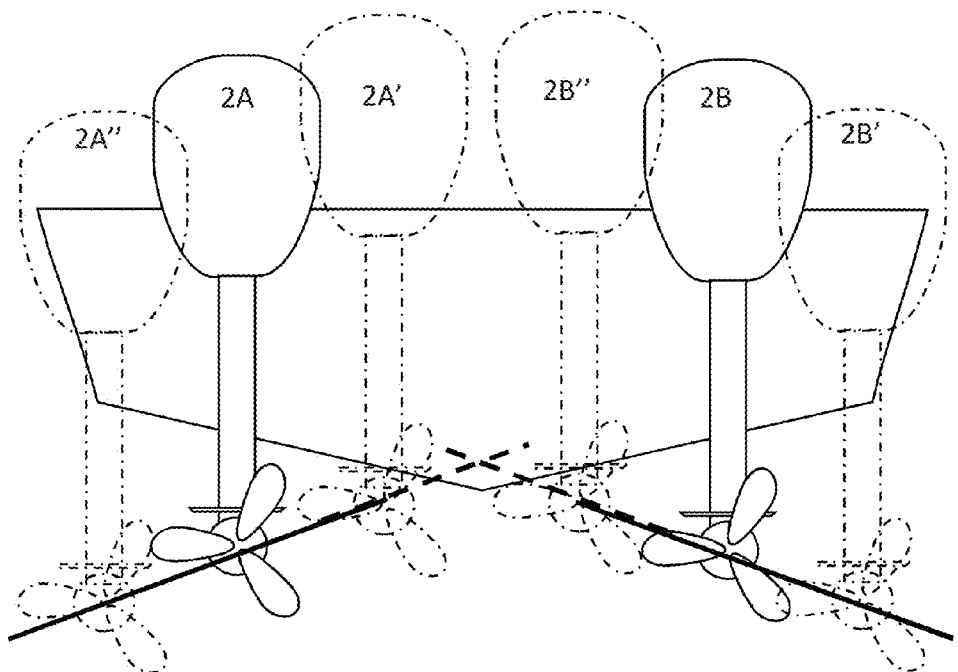
FIG. 16 and FIG. 17 are respectively a variant embodiment wherein each one of the two motors besides being translatable according to a transverse direction likewise
Figure 17:
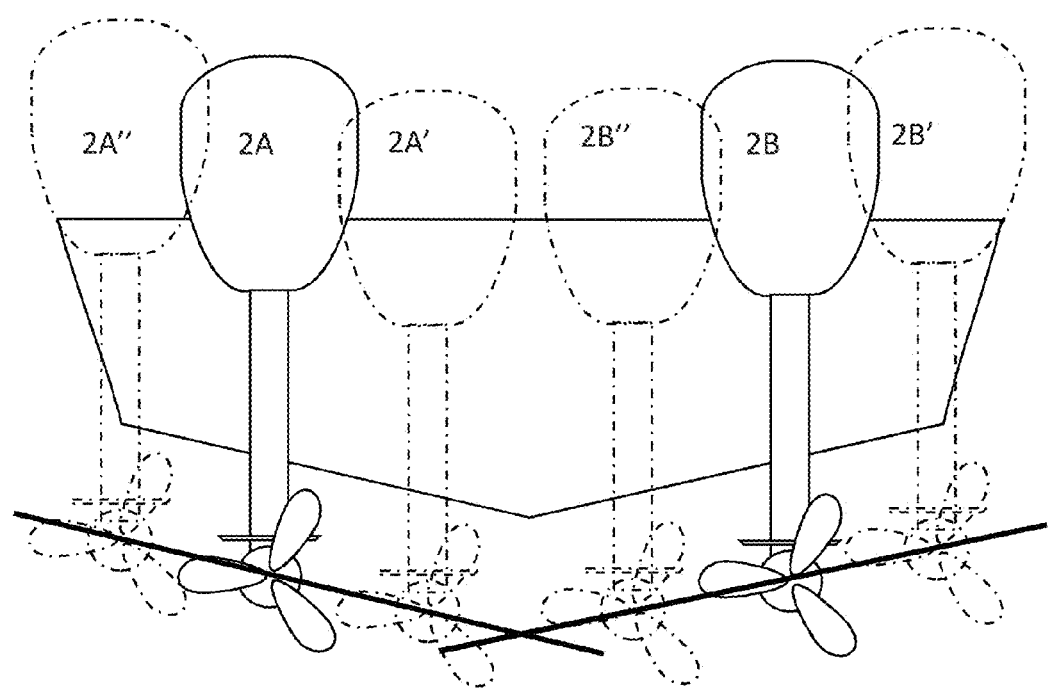

Such condition is shown for the embodiment where the marine vessel comprises two outboard motors in FIGS. 16 and 17.

In this case the two displacements are independent from each other and the motor or motors can take any position in said plane.

A variant embodiment provides the motor to be mounted so as to rotate not only about the steering axis but also about a further axis of rotation oriented with at least one component in the direction of the longitudinal axis of the hull.

Figure 2:
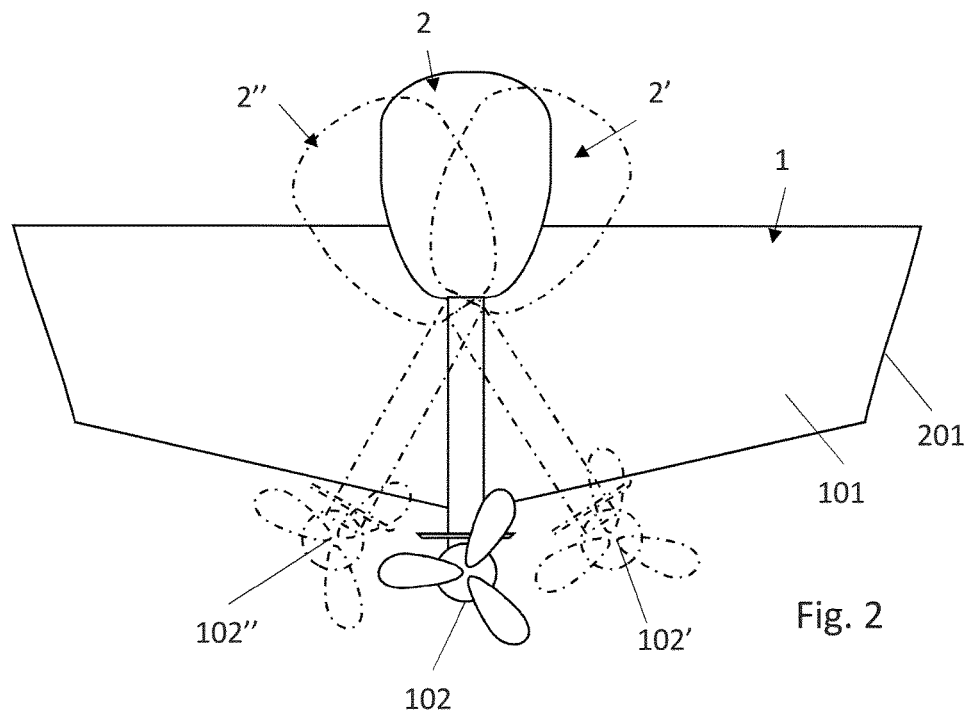
FIG. 2 schematically is one embodiment where a marine vessel is provided with only one motor which motor is rotatable about an axis of rotation coinciding with or at least parallel to or having at least one component parallel to the plane of symmetry S, thus translation movements according to FIG. 1 being constrained with translation movements in one vertical direction or direction parallel to the plane of symmetry S along a curved path, particularly circular path.

The axis of rotation can be provided coincident with an intermediate point of the height extension of the motor, and in the embodiment of the example of FIG. 2 it substantially coincides with the bracket fastening the motor to the transom, that is a supporting plate.

In the embodiment shown in FIG. 2, moreover the lateral inclination axis of the motor 2 is parallel to the keel line and contained in the plane of symmetry of the hull.

As it can be seen in FIG. 2, showing the motor in two lateral laid down positions, right and left 2', 2" respectively, the propeller 102 takes a position displaced to the right or to the left in relation to the plane of symmetry of the hull respectively as denoted by 102' and 102", and at the same time the lateral displacement in the direction of the corresponding side 201 is constrained along a circular path to an upward displacement of the propeller, namely in the direction of a smaller draft and moving near the underbody corner of the transom 101.

Figure 9:
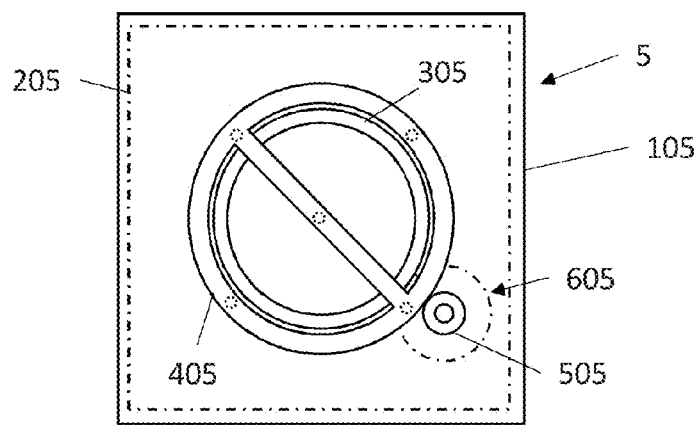
FIG. 9 schematically is a motor supporting device allowing the motor to rotate for being displaced according to the example of FIG. 2.

FIG. 9 shows a possible device 5 for attaching the motor to the transom 101 of the hull allowing the motor 2 to be laterally inclined as shown in FIG. 2.

A first plate 105 is fastened to the transom and bears a circular guide integral therewith. A second plate 205 supporting the motor 2 is shown in dashed lines and has a circular slide 405 coaxial to the circular guide 305. The circular slide 405 has external teeth engaging a pinion 505 controlled by an actuator that in the embodiment is for example an electric motor 605.

The embodiment of FIGS. 3 to 5 shows an arrangement combining the translation of the motor 2 both along a transverse direction, that is parallel at least for a component thereof to the midship section plane and to the waterplane of the hull, and along a displacement direction parallel to the longitudinal axis of the hull. The two motion components are constrained with each other and the motor 2 performs a path along a curved line.

In this embodiment the device 3 fastening the motor 2 to the transom 101 is made like a polygonal linkage and particularly a four-bar linkage the plate 103 fastening to the transom 101 being connected to the plate 203 supporting the motor by means of pairs of bars 303, 403 that are hinged to said plates with verticals axes, or anyway having a direction component vertical or parallel to the midship section plane and to the plane of symmetry of the hull.

As it is possible to see from FIGS. 3 to 5 in the two extreme lateral displacement positions of the motor 2 towards the corresponding side 201 of the marine vessel denoted by 2' and 2" respectively, the motor approaches the transom, while in the central position of FIG. 3, the distance of the motor from the transom 101 is maximum.

FIGS. 6 to 8 show a further variant wherein the motor is alternatively swung towards one or the other side by rotating about a hinge axis 304, 404 with at least a direction component oriented parallel to the midship section plane and to the plane of symmetry of the hull.

In the embodiment said hinge axes, for simplicity reasons, are oriented in a direction parallel to each other and to said midship section plane and to said plane of symmetry of the hull, however said hinge axes can be also inclined to a certain extent relative to such direction.

Specifically the device 4 fastening the motor to the transom 101 provides a plate 104 fastening to the transom, to which a supporting plate is hinged along two opposite vertical sides respectively.

The two hinge axes 304, 404 can alternatively be released from one of said two plates such to allow the motor 2 to be alternatively swung to the left as in FIG. 7 denoted by 2" and to the right as denoted by 2' in FIG. 8.

By such arrangement, the axis of the motor propeller can be placed perfectly perpendicular to the longitudinal axis of the hull and can act as a stern-thruster both separately and in combination with a bow-thruster, if any.

Figure 18:
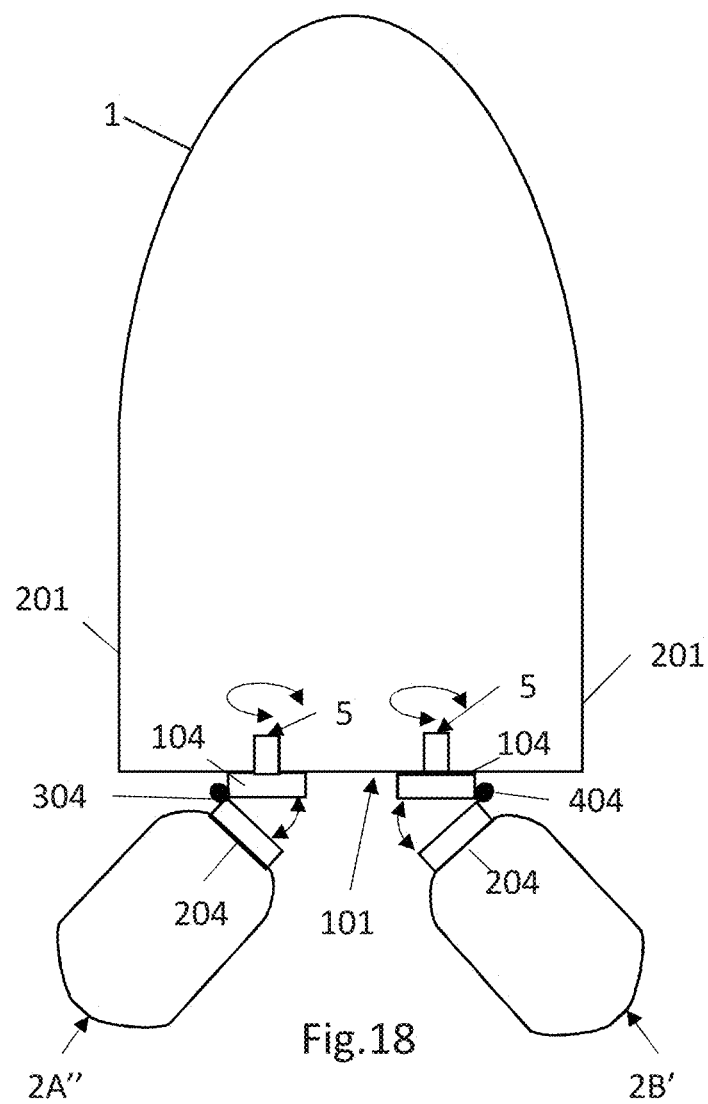
FIG. 18 is a variant embodiment of the embodiment of FIGS. 6 to 8 wherein the marine vessel is provided with two outboard motors.

The variant of FIGS. 6 to 8 can obviously be provided also with two or more motors as shown in FIG. 18 in order to generate further better adjustments in the translation movement that can be obtained by such function.

Even in the case of such variant embodiments of FIGS. 2 to 8 the described displacement can be combined not only with the steering rotation of the motor but also with a motor trim inclination and/or with a vertical translation.

Even in the case of FIGS. 6 to 8, the motor displacement occurs according to a curved path that combines a translation along a transverse axis—according to the meaning defined above—with a displacement in the longitudinal direction of the hull and in this case also together with a further orientation of the propeller and therefore of the thrust exerted thereby towards the center of rotation of the hull.

All the embodiments of FIGS. 1 and 3 to 8 can be combined with each other with the embodiment of FIG. 2.

This is shown in FIG. 18 for the case with two motors as regards embodiment according to FIGS. 6 to 8.

In this figure like parts have like reference numerals. FIG. 18 shows only a motion condition where the two motors are swung in opposite pivoting directions, namely swung towards the corresponding side 201. In this case, the thrust action of the propellers can be oriented towards a center of rotation of the hull allowing thrust forces to be generated that determine even only mere substantial leeway lateral translations of the hull limiting to the furthest extent rotations and/or movement components in longitudinal direction, forwards or backwards.

As it is shown very schematically, the plate 104 fastening to the transom 101 in turn can be fastened rotatably about a hub of a fastening device 5, namely replacing the supporting plate 205 of the embodiment according to FIG. 9 or it being fastened to said plate 205 instead of to the transom 101. Therefore arrows show also that in addition to the oscillation of the motors 2A and 2B it is also possible to rotate them about an oscillation axis parallel to or at least with a direction component parallel to the longitudinal axis of the hull.

Such combination can be applied both to embodiments described with reference to FIG. 1 and to those of FIGS. 3 to 5 and obviously it is provided in combination with the steering rotation of the motor or motors 2, 2A, 2B and possibly also with trim inclination and/or with vertical translation of the motor or motors.

Figure 10:
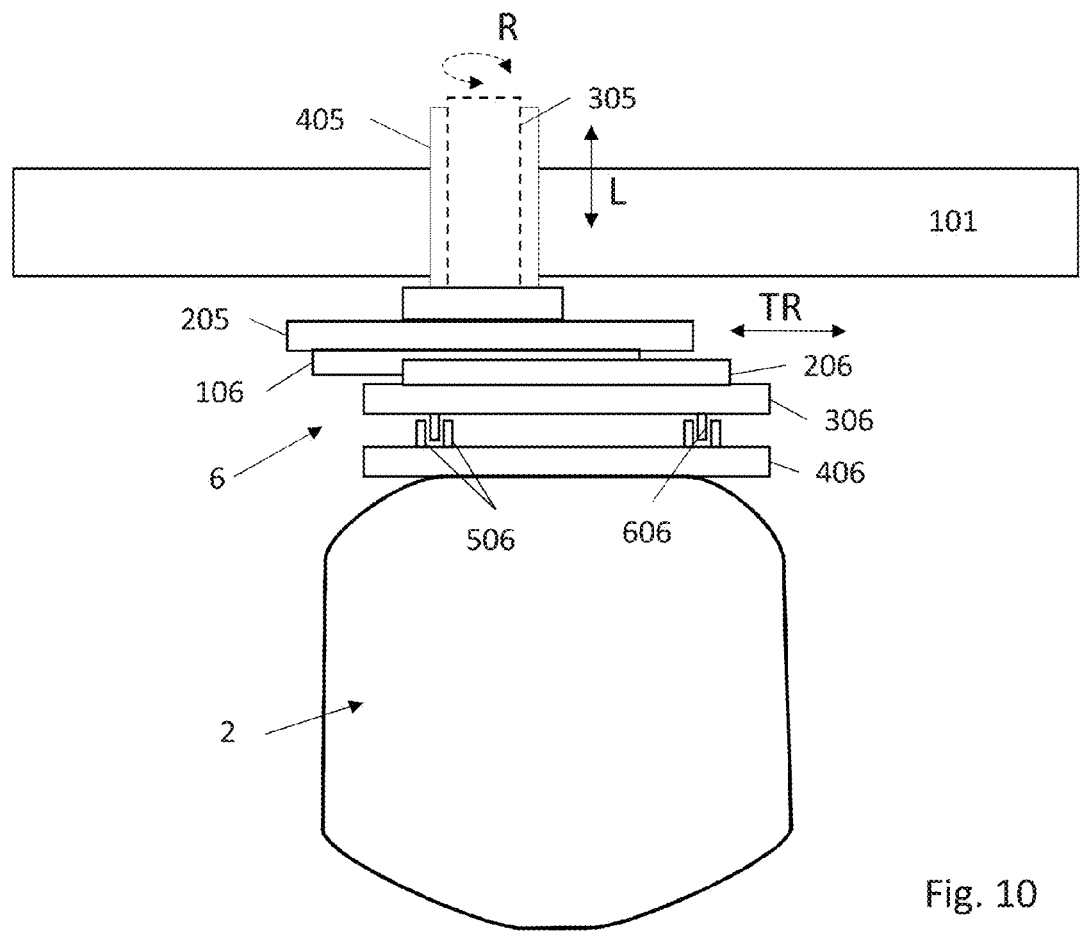
FIG. 10 is an example of a motor supporting device allowing the motor to translate according to three axes of a Cartesian system which axes are defined by the intersection straight lines of the planes composed of midship section, plane of symmetry and the waterplane of the hull.
Figure 11:
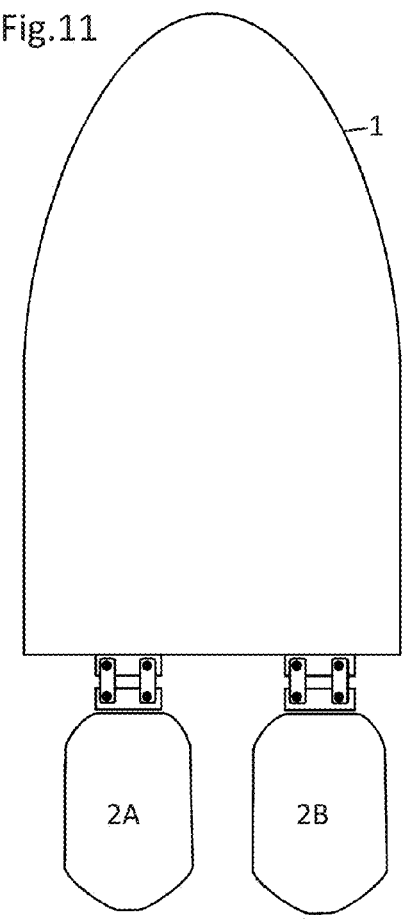
FIGS. 11 to 14 are an embodiment similar to that of FIGS. 3 to 5 the marine vessel being provided with two outboard motors, with the two motors in a neutral position, with the two motors in a position laterally translated in the same direction, with the two motors in a position mutually moved away from each other and in a position with the two motors mutually moved near each other to the greatest extent respectively.

FIG. 10 shows a motor fastening device 6 allowing the motor to translate along three directions perpendicular to one another, preferably the three directions defined by the straight lines of intersection of the midship section planes with the plane of symmetry and with the waterplane of the hull.

Moreover even a rotation about an axis parallel to the longitudinal axis of the hull is possible.

The fastening device 6, schematically shown, provides a plate 406 supporting the motor 2 having, on the side facing the transom, a pair of tracks composed of longitudinal ribs 506, spaced from each other such to form a sliding groove for a sliding runner 606 integral with a second plate that is a further sliding plate.

Tracks are oriented in a direction perpendicular to the waterplane and the supporting plate 406 moves with respect to the intermediate slide 306 in said upward and downward direction. The intermediate slide 306 in turn bears a pair of trucks 206 substantially like the tracks 506. The tracks 206 are oriented in a direction parallel to the midship section and to the waterplane, that is in a direction perpendicular to the tracks 506, and corresponding sliding runners 106 integral to a further plate 205 run therein. The latter is fastened to a telescopic shaft comprising a cylindrical hub 305 and a bushing 405 fitted so as to axially slide on said hub 305.

By such arrangement the device 6 allows the motor to be displaced in direction of the three axes defined by the straight lines of intersection of the three section planes that is the midship section plane, the waterplane and the longitudinal plane. Figure shows two translations with double arrows TR (transverse) and L (longitudinal).

According to a further characteristic as denoted by arrow R it shows how the cylinder 405 fitted on the hub 305 can further perform a rotation about its own axis like what described in FIG. 9.

In all such embodiments displacements can be controlled in a known manner by mechanical, electromechanical, hydraulic, electrohydraulic, electric or electronic actuators and their selection falls within the basic knowledge of the person skilled in the art.

FIGS. 11 to 14 show the example of FIGS. 3 to 5 with a marine vessel having two outboard motors mounted in a position symmetric to the plane of symmetry of the hull.

Figure 12:
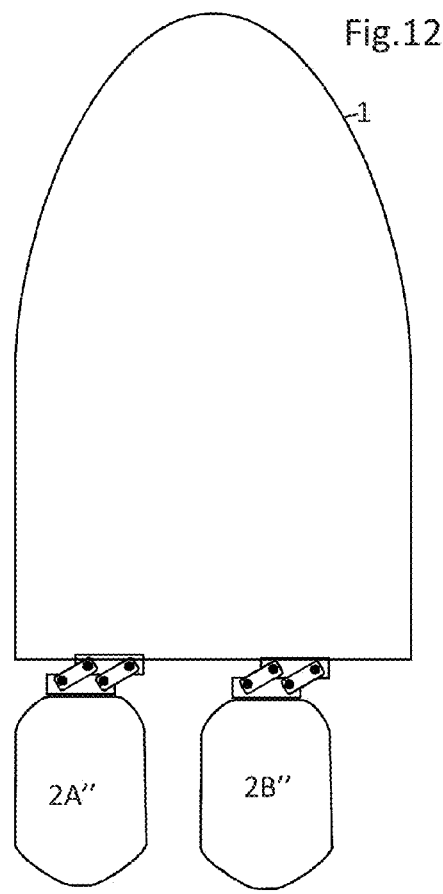
Figure 13:
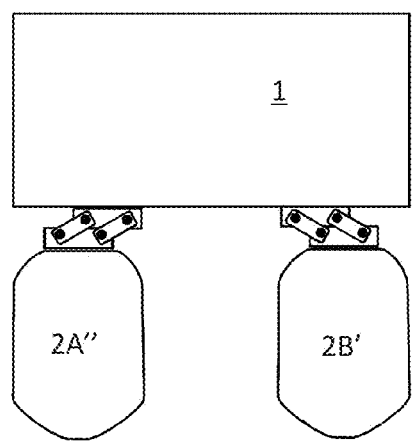
Figure 14:
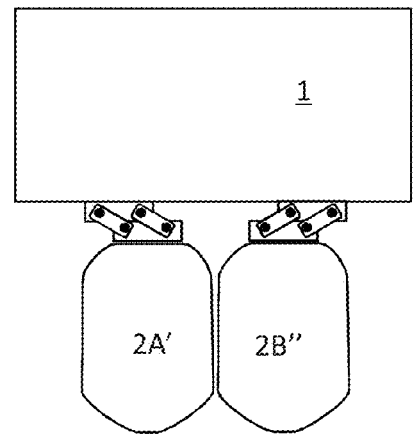

As it results from figures, the two motors 2A and 2B can be both moved in a concordant direction to the right or to the left as shown by 2A" and 2B" or in opposite direction moving away from each other such as shown in FIG. 13 by 2A" and 2B' or moving near each other such as shown in FIG. 14 by 2A' and 2B". The condition of FIGS. 12 and 13 is a preferred condition for maneuver activities while the position of FIG. 14 is a preferred condition during navigation.

Figure 15:
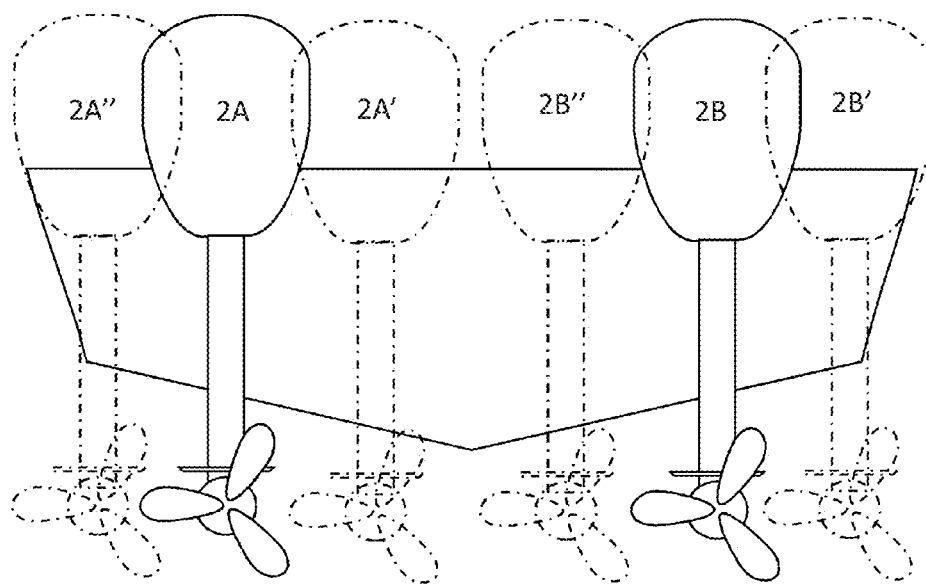
FIG. 15 is a view on the transom of a marine vessel provided with two motors each one translatable correspondingly to the example of FIG. 1.

FIG. 15 shows the possible positions of the two motors 2A and 2B. The central position shown by 2A and 2B is shown by a solid line and the two right and left positions, 2a' and 2A", 2B' and 2B" respectively are shown by a dashed line.

By using a fastening device of the type similar to the device 6 or by using a fastening device having only the three plates 406, 306 and 205 with respective tracks, it is possible to associate a translation in the vertical direction that is a direction displacing the two motors in a direction with a larger or smaller draft of the propellers.

In principle it is possible to provide two alternative modes schematically shown in FIGS. 16 and 17.

The first provides that with the progressive displacement of the motors towards the corresponding side 201 they are also progressively vertically lowered, with a larger draft, while a displacement towards each other towards the plane of symmetry of the hull is combined with a smaller draft.

The relation between displacement according to two perpendicular directions can be a linear function or a non-linear function, that is the path occurs according to a curved line.

FIG. 16 and FIG. 17 show a linear relation between the motion components in the two directions.

In FIG. 16, however, the trajectory is a V-shaped one diverging towards the bottom, while in FIG. 17 the trajectory is a V-shaped one diverging to the top.

In this case the displacement of the motors 2A and 2B towards the corresponding side 201 of the hull is combined with the motors being lifted with a smaller draft, and the movement near the plane of symmetry is combined with the motors being lowered towards a larger draft.

The displacement path of the motors in this case can also be linear or non-linear. Moreover in case of a linear path as shown in FIG. 17 it is possible, but not necessary, for said path to be substantially parallel to the arrangement of the lower bottom corner of the transom.

Any other path is also possible even of the type exhibiting the maximum or minimum draft condition of the motors in an intermediate point of the displacement path.

As mentioned above, actuators can be of any known type, while the marine vessel comprises in combination with one of said devices fastening the motor or motors a control system that comprises a central unit with at least one processor to which memories are associated (not shown in details). Such central unit can be of any known type and can operate according to different hardware and software architectures.

The central unit 10 receives control signals from one or more control members of the vessel such as a steering control member 11, a control member 12 regulating the number of revolutions of the motor or motors, a control member 13 switching the reverse gear and a motor displacement control member 14.

Moreover to the central unit 10 there are also associated interfaces 16 for selecting operating modes of the marine vessel and at least one displaying interface 16.

On the basis of the control signals generated by the control members and of the selections performed through interfaces 15 and 16, the central unit controls a unit 26 generating signals powering the actuators that generates and provides to the actuators the power supply necessary to perform an action corresponding to the control signal generated by the control members.

It is possible for each control member to operate independently from other control members, therefore the user can set a steering angle, a position of the motor or motors or a given number of revolutions and a travelling direction regardless of the setting of the other control members.

As an alternative it is also possible to select an operating mode that constrains the setting of one or more controls on the basis of the setting provided for one or more other controls.

This is obtained by means of a configuration/setting program that allows configuration parameters of displacement functions of the marine vessel to be stored in a memory 25. Such program can provide a module 22 for configuring the possible displacements of the motor or motors, a program 23 generating corresponding control signals and a program 24 combining the control signals deriving from different control members.

For each type of maneuver, navigation rate or attitude and/or motion effect of the marine vessel it is possible to set different displacement conditions of the motors, related to predetermined conditions of number of revolutions of the motor or motors, predetermined forward or reverse movement conditions of the motor or motors and predetermined steering angles of the motor or motors.

According to an improvement to each mode it is possible to assign a selection and activation/deactivation push button.

Moreover according to still a further characteristic, the control signals of the several control members 11 to 14 can be related with one another by a functional relation such that a change in one of the control signals generated by a control member automatically causes control signals of one or more of the other control members to change.

Still according to an improved embodiment, it is possible to check the configuration settings to really have the desired effects on the marine vessel. To this end one or more motion condition sensors can be connected to the central unit 10 that, on the basis of measurement signals, determines the real motion condition and compares it with the theoretical one. If they do not match it automatically performs a correction of one or more control signals, minimizing the difference between real motion condition and theoretical motion condition.

Figure 19:
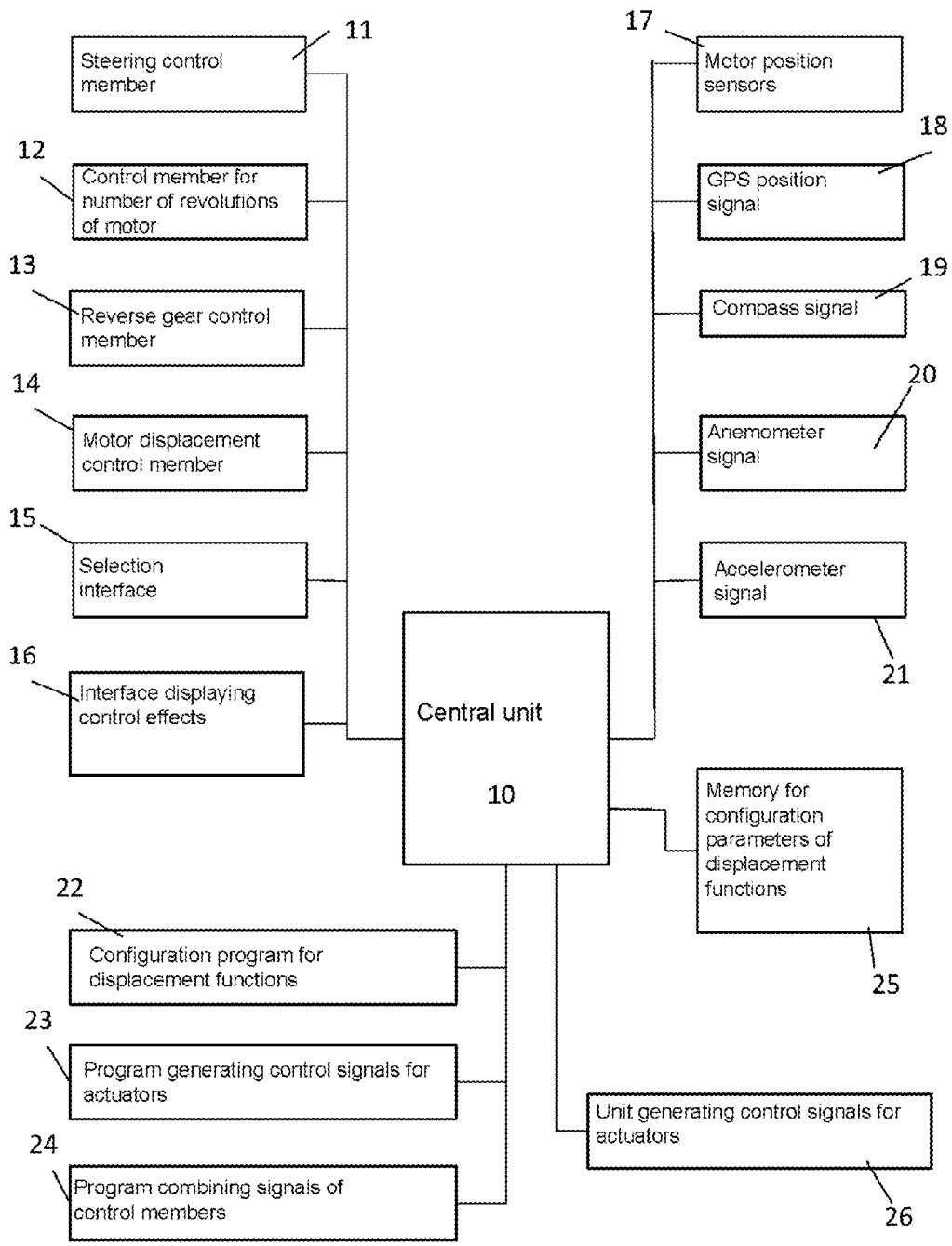
FIG. 19 is a block diagram of one embodiment of a control unit for a marine vessel provided with a system for translating the outboard motor or motors.

FIG. 19 shows a list of a plurality of said sensors by way of a non limitative example such as sensors 17 for the position of the motor or motors, GPS sensors 18 determining the vessel location, compass signal 19, anemometer signal 20, accelerometer signals 21.

The system can be widely integrated and changed according to different standards known in prior art both as regards hardware and software.

Figure 20:
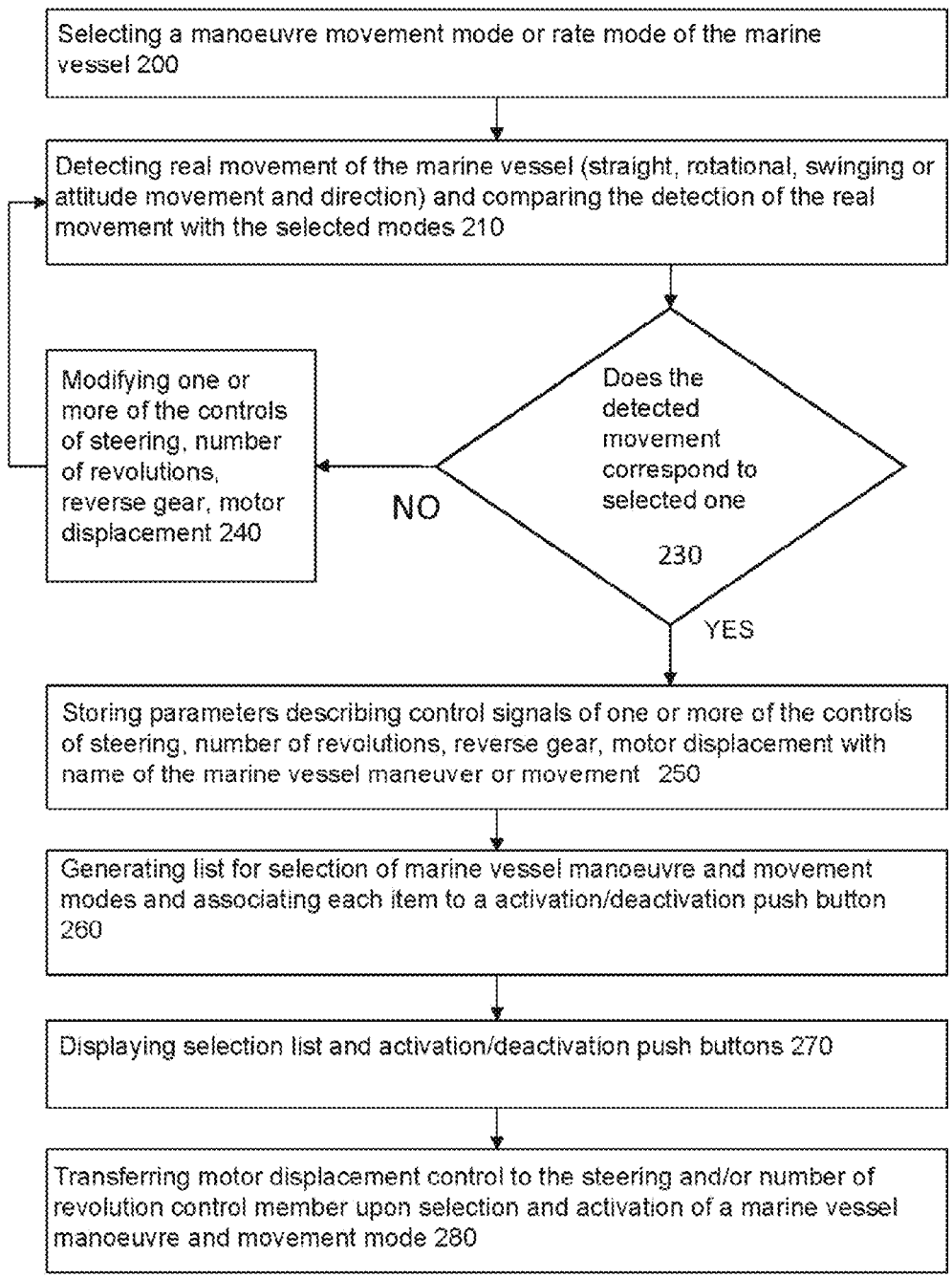
FIG. 20 is a flow chart of a process for configuring the control system of the marine vessel according to the present invention.

The flow chart of FIG. 20 schematically shows an example for configuring the vessel according to the present invention.

At step 200, through suitable interfaces, the user selects a maneuver movement or rate mode of the marine vessel that can be already stored upon installation or that has to be set by the user during first use.

Once setting the parameters about the position of the motor or motors for a given setting of the number of revolutions, setting of the reverse gear and of the steering angle of the motor or motors, a detection occurs whether the effect on the vessel is the desired one and therefore whether the vessel moves as desired.

Information detected in this step 210 is compared at step 230 with theoretical parameters of the desired movement.

If they do not match one or more control signals have to be modified such as shown at step 240. This can take place both manually and automatically, for example as a feedback among signals of sensors 17 to 21 and corrections of the control signals, always verifying the differences between theoretical, desired and real movement of the marine vessel.

If such comparison meets the substantial identity criteria, within predetermined tolerances, at step 250 said setting parameters of the control signals are stored, as well as the correlation functions among the control signals of the different control members are stored.

Thus at step 260 a list of items is generated corresponding to controls selecting different vessel maneuver and movement modes obtained by repeating the above mentioned steps for each of a plurality of possible rate or maneuver modes. Each one of them is associated to an activation/deactivation push button provided in a configurable interface, such as for example a graphical interface on a touch screen.

The selection list is displayed on said screen at step 270.

According to an improvement, once the parameters setting the control signals for each rate or maneuver mode are set it is possible to provide to partially transfer the control on the control signals of one or more of the further control members to a single control member.

Thus for example it is possible to transfer an adjustment of the number of revolutions and/or of the position of the motors and/or of the setting of the reverse gear to the steering control member that operates when steering angles higher or smaller than predetermined threshold values are set.

Figure 21:
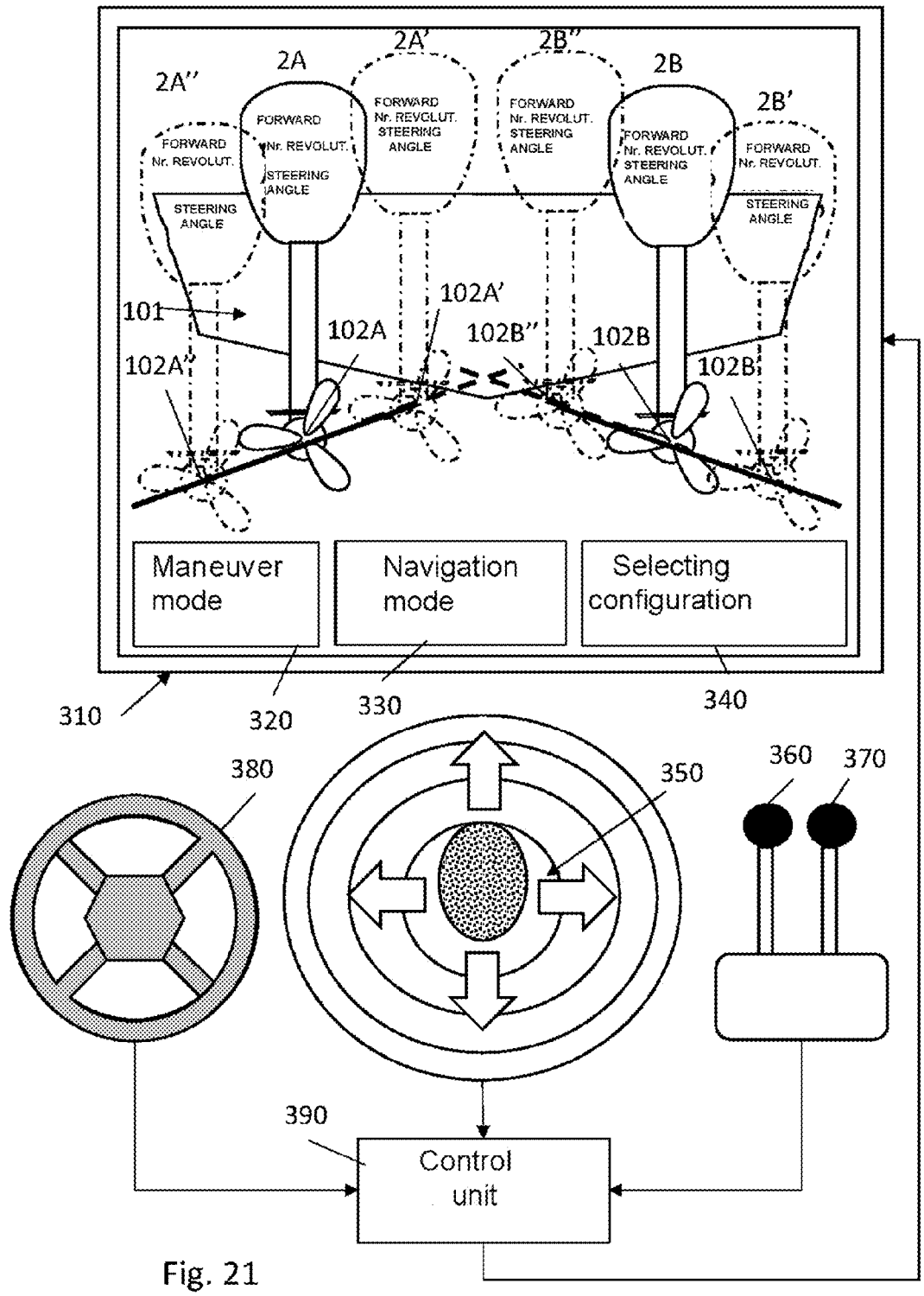
FIG. 21 schematically is a possible user interface of a vessel according to the present invention.

FIG. 21 schematically shows an example of a user interface.

350 denotes a joystick that is the control member for the position of the motor or motors.

In presence of two or more motors, the same joystick 350 can be used to control the displacement of each motor independently from each other, for example by means of a selector.

It is also possible to provide the selector to operate a mode by means of which the joystick 305 controls the displacement of the two motors together according to predetermined synchronization functions of the displacement of the two motors one with respect to the other one and of the selection of a specific rate or maneuver mode, by means of selection push buttons 320, 330, 340.

360 and 370 denote levers for regulating the number of revolutions and the reverse gear of one or more motors, in the specific case of two motors, while 380 denotes a steering wheel.

The joystick 350, the levers 360 and 370 and the steering wheel 380 are connected to a control unit 390 that can provide for each one of said control members a system of the mechanical, hydraulic, electromechanical, electrohydraulic, electric, magnetic type or the like and that in the present case with reference to FIG. 19 is of the electric type where the movement of the control members is converted in electrical signals that in turn, interpreted by the central unit 10, allow the power signal of the type suitable for the selected actuator, to be generated.

In the shown example the user interface is a graphical interface displayed on a screen 310 of the touch-screen type.

The button bar shows the buttons 320, 330, 340 selecting the maneuver modes, navigation modes and setting modes.

The upper area shows for example a pictogram showing the transom 101 and the set position of the motors 2A and 2B possibly for each motor showing the set data for reverse gear, number of revolutions and steering angle.

Preferably the shapes show the position of the propellers 102A and 102B. In FIG. 21 the condition is the centered and symmetric condition of the two motors and the image with solid lines is the one pointed out on screen. Positions 2A' and 2A" and 2B' and 2B" are shown in broken lines to show that they will be displayed only when the motors will be moved in said positions, by the action of the joystick 350 or the combined action of one or more of the control members 350, 360, 370, 380.

FIG. 21 shows extreme positions, but obviously it is possible for the screen to show also the intermediate positions of each motor when such positions are taken on the basis of the transmitted controls.

Finally it has to be noted that although in the figures of the embodiments the motors have been shown as always placed substantially in a symmetrical manner relative to the plane of symmetry of the marine vessel, it is possible for the two or more motors to take also non-symmetrical positions relative to said plane of symmetry.

Moreover it has to be noted that the shown examples show only some non limitative embodiments, thus for example it is possible to provide any mechanism for supporting the motors that allows them to be moved relative to the transom according to different translation and rotation axes. The configuration of such mechanisms is also any configuration.

Likewise also the control members for the displacement of the motor or motors can be any type and are not limited to those described and shown for the several functions. Thus for example instead of the joystick it is possible to provide a combination of push buttons or other types of control members.

The invention claimed is:

1. A combination of marine vessel and outboard motor, comprising:
    at least one outboard motor attached in a predetermined position to a transom of the marine vessel, the at least one motor being mounted so as to translate according to a path having at least one motion component with an orientation parallel to a direction of a transverse axis of a hull, or parallel to the transom and alternatively towards one or another side of the hull,
    wherein the at least one outboard motor is operatively coupled to one or more control members, so as to cause a change in position of the at least one outboard motor relative to the transom in combination with setting a steering angle, a number of revolutions, or a reverse gear setting condition of the at least one outboard motor by at least one of the one or more control members.

2. The combination of marine vessel and outboard motor according to claim 1, wherein there are at least two outboard motors independently movable from each other according to a path having at least one displacement component parallel to the transom or perpendicular to the transom.

3. The combination of marine vessel and outboard motor according to claim 2, wherein the at least two motors are movable near or away from each other, each motor being mounted so as to translate according to the path having at least one displacement component parallel to the direction of the transverse axis of the hull or parallel to the transom of the hull and alternatively towards the one or the other side of the hull.

4. The combination of marine vessel and outboard motor according to claim 1, wherein the motion occurs in one direction with at least one component parallel to a midship section and to a waterplane of the hull.

5. The combination of marine vessel and outboard motor according to claim 1, wherein the motion of the at least one motor occurs by a translation in a two-dimensional plane, a displacement path being straight or curved.

6. The combination of marine vessel and outboard motor according to claim 1, wherein the motion occurs according to three axes perpendicular to one another.

7. The combination of marine vessel and outboard motor according to claim 1, wherein the motion of the at least one motor occurs by an additional rotation according to a substantially vertical axis or an axis substantially parallel to a longitudinal axis of the marine vessel.

8. The combination of marine vessel and outboard motor according to claim 1, wherein the motion of the at least one motor or motors is caused by devices fastening the at least one motor to the transom with mechanical, electric, hydraulic, electrohydraulic, electromechanical, or magnetic displacement actuators.

9. A method of steering a marine vessel having one or more outboard motors, comprising:
    moving at least one outboard motor according to a path with at least one motion component having an orientation parallel to a direction of a transverse axis of a hull, or parallel to a transom of the hull and alternatively towards one or another side of the hull, wherein a change in position of the at least one outboard motor relative to the transom is combined with setting a steering angle, a number of revolutions, or a reverse gear setting condition of the at least one outboard motor.

10. The method according to claim 9, wherein a displacement of the motor or motors occurs in a plane parallel to a midship section or perpendicular to a longitudinal plane of symmetry of the marine vessel by combining two linear translations according to two directions not parallel to each other.

11. The method according to claim 10, wherein the translation in the plane parallel to the midship section or perpendicular to the plane of symmetry is parallel to a transom or to a tangent thereof and occurs along a path corresponding to a curved line.

12. The method according to claim 9, wherein the at least one outboard motor is displaced according to three motion components that are not parallel to one another.

13. The method according to claim 9, wherein a rotation of the at least one outboard motor is performed according to an axis parallel to a longitudinal axis of the marine vessel, or having at least one component parallel to the longitudinal axis, or according to an axis parallel to a midship section and to a longitudinal plane of symmetry of the hull.

14. The method according to claim 9, wherein a displacement of the at least one outboard motor is performed by combining a translation of each motor towards a side of the hull with a downward displacement of the at least one outboard motor increasing a draft of propellers and a displacement of the at least one outboard motor towards a plane of symmetry with an upward displacement decreasing the draft, or vice versa.

15. The method according to claim 9, wherein a displacement of the at least one outboard motor is performed in combination with a steering rotation of the at least one outboard motor or with a trim inclination of the at least one outboard motor.

16. A propulsion group for a marine vessel comprising:
at least one outboard motor;
devices fastening the at least one outboard motor to allow the at least one outboard motor to be moved along predetermined linear two-dimensional and three-dimensional paths by displacement actuators; and
a system controlling the actuators driving said devices, the system comprising at least one control member operable by a user and at least one control unit receiving control signals generated by the at least one control member and transforming the control signals into power signals, thereby operating the displacement actuators according to the control signals generated by the at least one control member,
wherein the at least one outboard motor is operatively coupled to the at least one control member, so as to cause a change in position of the at least one outboard motor relative to a transom in combination with setting a steering angle, a number of revolutions, or a reverse gear setting condition of the at least one outboard motor by at least one of the at least one control member.

17. The propulsion group according to claim 16, further comprising one or more sensors checking displacement conditions of the at least one outboard motor or attitude and advancing conditions of the marine vessel that operate as feedback signals in an automatic or manual feedback loop.

18. The propulsion group according to claim 17, wherein the system comprises at least one processor executing a configuration/setting program to determine, based of the feedback signals, predetermined settings of position of the at least one outboard motor with reference to predetermined maneuver or navigation conditions.

19. The propulsion group according to claim 16, wherein the at least one control member comprises a plurality of predetermined settings available to the user, which are retrievable from a memory by way of a selection interface.

20. The propulsion group according to claim 16, further comprising a graphical interface for a graphical representation associated to the at least one control member, provided as a plan view, on a transom or a projection view on a plane parallel to a midship section of the marine vessel, of the transom, images of the at least one outboard motor in a corresponding translation position relative to the transom being associated to at least some positions of the at least one control member.

* * * * *